Nov. 17, 1970     J. J. DI PONIO     3,540,108

METHOD FOR ROLLING GEARS

Filed Jan. 5, 1968     3 Sheets-Sheet 1

JOHN J. DiPONIO
INVENTOR

BY John R. Faulkner
Donald J. Harrington
ATTORNEYS

Nov. 17, 1970 — J. J. DI PONIO — 3,540,108
METHOD FOR ROLLING GEARS
Filed Jan. 5, 1968 — 3 Sheets-Sheet 2

JOHN J. DiPONIO
INVENTOR
BY John L. Faulkner
Donald J. Harrington
ATTORNEYS

Nov. 17, 1970  J. J. DI PONIO  3,540,108
METHOD FOR ROLLING GEARS
Filed Jan. 5, 1968  3 Sheets-Sheet 3
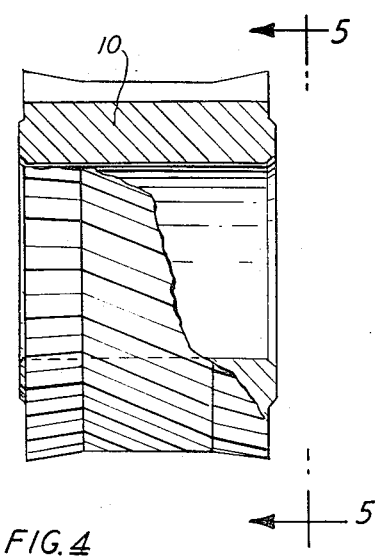
FIG. 4
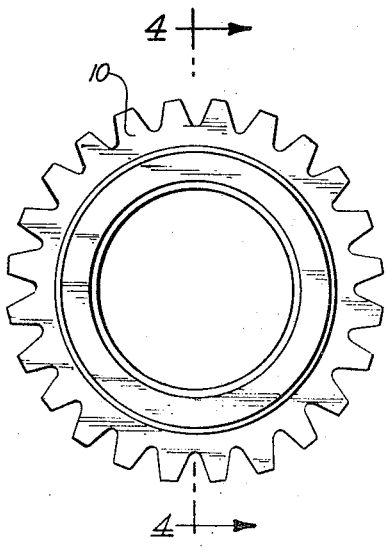
FIG. 5
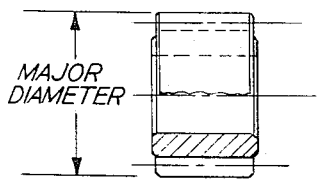
FIG. 6
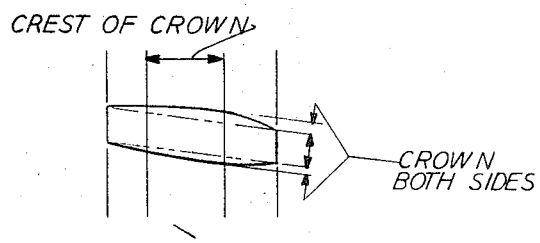
FIG. 7
```
         EXTERNAL GEAR DATA
          FULL FILLET ROOT
NO. OF TEETH                           19
NORMAL DIAMETRAL PITCH                 19.3
HELIX ANGLE REF.                       21.06166329° R.H.
LEAD                                   8.6060
NORMAL PRESSURE ANGLE                  20°
PITCH DIAMETER                         1.05493150
BASE CIRCLE DIA. REF.                  .98282300
MINOR DIA.                             .967-.947 DIA
NORMAL CIRCULAR TOOTH THICKNESS AT PD. .1004-.0989
TO MEASURE 1.2765-1.2737 OVER TWO .109375 BALLS (REF)
```
FIG. 8
JOHN J. DiPONIO
INVENTOR
BY John R. Faulkner
Donald J. Harrington
ATTORNEYS

United States Patent Office 3,540,108
Patented Nov. 17, 1970

3,540,108
METHOD FOR ROLLING GEARS
John J. Di Ponio, Union Lake, Mich., assignor to Ford Motor Company, Dearborn, Mich., a corporation of Delaware
Filed Jan. 5, 1968, Ser. No. 695,941
Int. Cl. B21d 53/28; B23p 15/14; B21h 5/00; B29d 15/00; B21k 1/30
U.S. Cl. 29—159.2          7 Claims

ABSTRACT OF THE DISCLOSURE

This disclosure describes a method for rolling gears from solid blanks. The blanks to be rolled are mounted between two circular rolling dies, one of which can be advanced toward the other. Upon rotation of the dies, metal is displaced by the dies as the die teeth form the desired gear tooth geometry on the gear blank.

BRIEF SUMMARY OF THE INVENTION

My invention comprises improvements in a method for rolling gears by using circular dies such as those found in co-pending application Ser. No. 516,929, now Pat. No. 3,362,059, filed Dec. 28, 1965, which is assigned to the assignee of my invention.

The gear blank, which is formed of solid bar stock, is semi-finished by rough machining. This involves pregashing the gear blank by means of a conventional hobbing machine operation. Either before or after this pre-hobbing method step, the blank is modified by machining a concave form on the outside diameter. This compensates for the normal tendency of the gear teeth to acquire a metal build-up at the center of the blank during subsequent gear rolling steps.

The semi-finished gears then are placed in a gear rolling fixture and gear rolling dies with external involute die teeth are brought into rolling engagement with the gear blank during a rough rolling operation. This rolling step leaves several thousandths of an inch of metal on the gear teeth.

The gears then are prepared for a finished rolling operation with finish rolling dies. These dies provide the proper involute form and crowning effect on the gears. If desired, the O.D. of the gear can be ground to remove excess metal build-up on the addendum circle and at the edges of the teeth if the build-up is considered to be objectionable.

In conventional thread rolling and spline rolling operations, it is possible to roll the teeth to the proper form, but the teeth of the rolling die are subject to rapid wear. Under these circumstances, such known rolling operations are not feasible for high-production, continuous, manufacturing operations for precision gears. Precision tolerances on the die teeth cannot be maintained because of the wear that accompanies the displacement of the metal from the gear blank. This problem is avoided in my improved rolling method wherein the largest portion of the formed metal is displaced from the gear blank during the rough rolling operation. The die teeth used in this rough rolling step are not of critical geometry. The dies themselves, therefore, can be relatively inexpensive to manufacture. After wear occurs, the rough dies can be re-ground. The finish dies then are required to displace only a minimum amount of metal and, therefore, they may be made with precision tolerances.

BRIEF DESCRIPTION OF THE DRAWINGS

FIG. 2 is taken along the plane of section line 2—2 of FIG. 3.

FIG. 4 is an elevation view of a gear that is modified to form a convex gear outer periphery prior to the finish rolling operations. FIG. 4 is taken from the plane of section line 4—4 of FIG. 5.

FIG.5 is a cross-sectional view taken along the plane of section line 5—5 of FIG. 4.

FIG. 6 is a detailed vew of a finished gear formed by my improved gear rolling method.

FIG. 7 is a plan view of one gear tooth for the gear of FIG. 6.

FIG. 8 is a chart showing the gear data for the gear of FIG. 6.

PARTICULAR DESCRIPTION OF THE INVENTION

Figure 1:
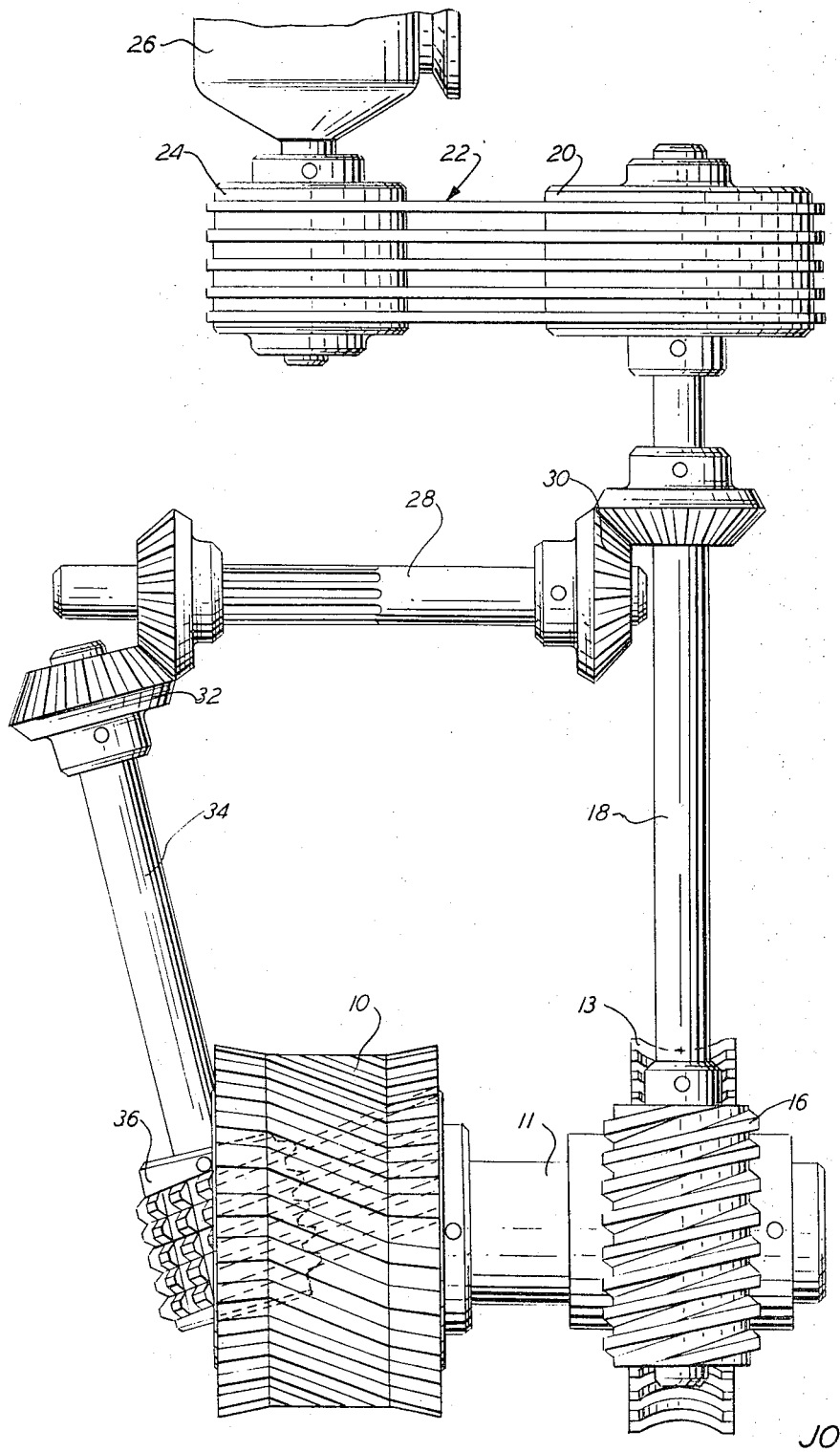
FIG. 1 shows in schematic form a hobbing machine for rough cutting gashes on a gear blank prior to the finish rolling operation.

In FIG. 1 numeral 10 designates a gear blank. It is mounted on a spindle shaft 11 which may be driven by drive gear elements 13 and 16. Gear element 16 is drivably connected to driveshaft 18 and gear element 14 is drivably connected to the spindle shaft 11. Shaft 11 rotates causing the gear blank 10 to rotate at a predetermined speed as it undergoes the pre-hobbing step.

Shaft 18 is driven by a drive pulley 20 which forms a part of a belt drive 22. The input element of the belt drive is a pulley 24 powered by electric motor 26.

Shaft 18 is drivably connected to a cross shaft 28 through right angle drive gearing 30. A cross-axis drive gear arrangement 32 drivably connects shaft 28 also to driveshaft 34. Shaft 34 carries a hobbing gear tool 36 which gashes or rough cuts gear teeth in the gear blank 10.

Prior to or following the rough cutting of the gear blank, the gear blank is formed with a concave peripheral profile, as indicted best in FIG. 4. The diameter of the gear blank at each of the axial sides of the gear blank is greater than the diameter of the blank at its center. The amount of the convex curvature may be approximately .020 inch on a radius.

Figure 2:
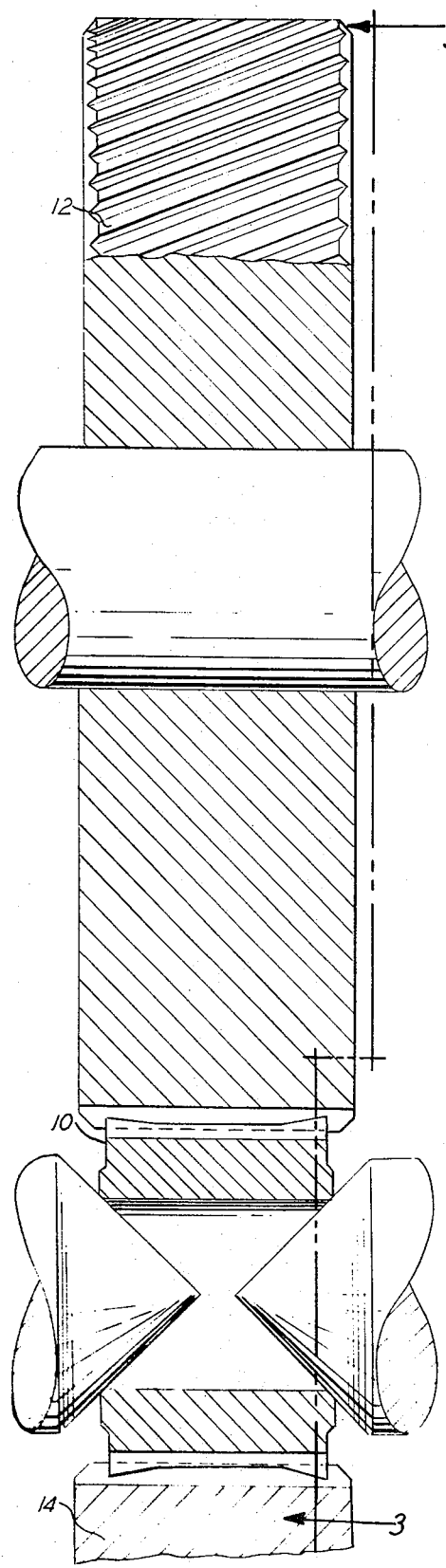
FIG. 2 is an assembly view partly in section showing rolling dies in rolling engagement with a gear blank.
Figure 3:
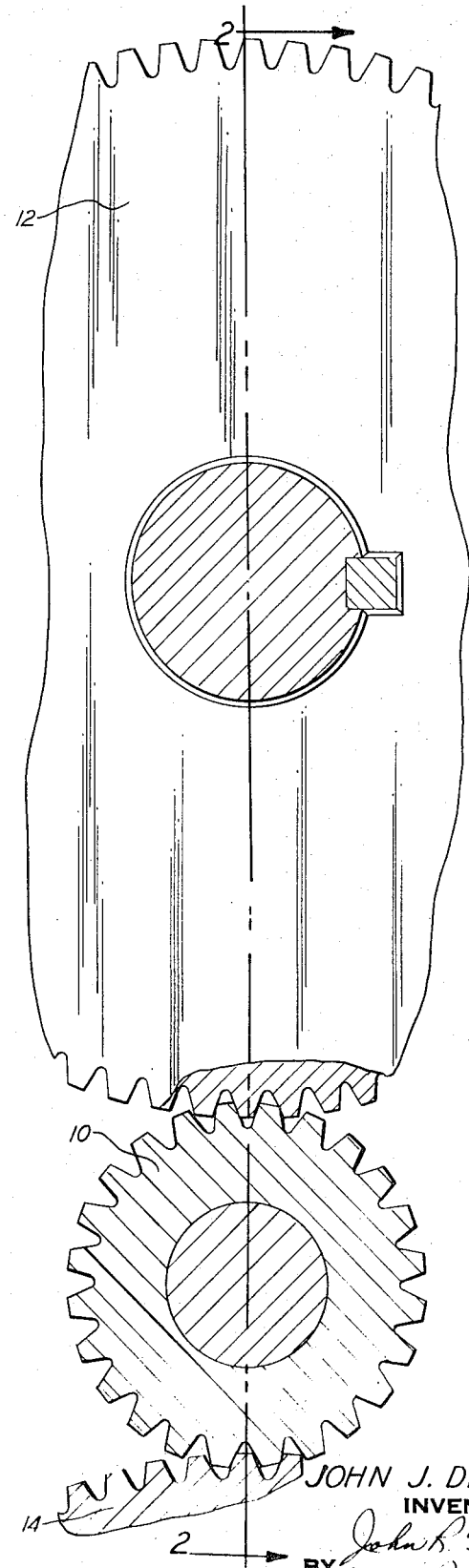
FIG. 3 is an end view as seen from the plane of section line 3—3 of FIG. 2.

When this is accomplished, the gashed gear blank is mounted on centers such as those indicated in FIG. 2. A pair of dies 12 and 14 are rotatably mounted on axes that are parallel to the axis of the blank 10. The center distance between the dies is closed by means of a hydraulic press or other suitable powering machine so that the preformed ground teeth on the dies engage the gashes or gear tooth spaces on the blank.

The dies 12 and 14 can be formed with external helical gear teeth in a manner similar to the teeth of the dies described in co-pending application Ser. No. 516,929, now Pat. No. 3,362,059.

As the dies are subjected to gear rolling forces, metal is displaced from the blank. There is a normal tendency for the metal to flow towards the center of the rolled gear tooth from the ends. It is for this reason that the concave blank form indicated in FIG. 5 is provided. The resulting gear tooth shape then will be approximately dimensionally accurate as the diameter of the gear at the center of the blank increases due to metal flow.

The gear stock is formed with a diameter that is approximately .090 to .100" undersized in order to compensate for the growth on the outside diameter of the gear that takes place during rolling.

After this rough rolling operation is finished, the partly finished gear 10 is removed and placed between finish rolling dies that may resemble in general appearance the dies 10 and 14.

This finish rolling is a precision operation. The amount of the metal displaced may be sufficient to change the tooth thickness only approximately .002″. This requires a minimum amount of metal flow, and the wear on the finish die teeth is a minimum. The rolling pressure also can be reduced thereby maintaining dimensional accuracy of the unfinished tooth form.

After the gear is rolled to its full depth, the gear may be end-faced to remove excess metal build-up. Also the O.D. may be ground or machined in some other fashion to its finish size.

The finish rolling operation can produce the desired crowning effect on the finished gear teeth. This is done by modifying appropriately the die teeth on the finish rolling dies. No shaving operation is required after the finish rolling die step.

By preference, the pregashing step is done on a hobbing machine, as described previously. It is possible, however, that this can be accomplished by an extrusion process. The concave profile of the gear blank, which is formed prior to the rough rolling operation, might be accomplished also following the gashing or extruding process during which the rough cut is made.

Following the finish rolling operation, the gear may be heat treated in the usual way to provide surface hardness and the impact strength.

Having thus described a preferred form of my invention, what I claim and desire to secure by U.S. Letters Patent is:

1. A gear rolling method for rolling gear teeth from a solid blank comprising the steps of forming a cylindrical gear blank from bar stock, modifying the periphery of said blank by forming a concave form on the outside diameter thereof, whereby the edges of said blank on either axial end thereof are enlarged in diameter, gashing said blank by rough cutting teeth in the periphery thereof to remove excess metal in the tooth spaces to be formed on the blank, mounting said gear blank for rotation about its axis, mounting a pair of rolling dies with external die teeth thereon for rotation about axes parallel to the axis of said gear blank, said dies being adapted to advance toward said gear blank whereby the external teeth formed thereon register with the gashes formed on said blank to form rough gear teeth on said blank while leaving said teeth with a predetermined excess thickness, and finish rolling said rough rolled gear blank with finish dies mounted for rotation about parallel axes spaced from and parallel to the axis of said rough rolled blank.

2. The combination as set forth in claim 1 wherein the rough rolling operation occurs after the concave periphery is machined on said gear blank.

3. A gear rolling method for rolling gear teeth from a solid blank comprising the steps of forming a cylindrical gear blank from bar stock, gashing said blank by rough cutting teeth in the periphery thereof to remove excess metal in the tooth spaces to be formed on the blank, modifying the periphery of said blank by forming a concave periphery on the outside diameter thereof, whereby the edges of said blank on either axial side thereof are enlarged in diameter, mounting said gear blank for rotation about its axis, mounting a pair of rolling dies with external die teeth thereon for rotation about axes parallel to the axis of said gear blank, said dies being adapted to advance toward said gear blank whereby the external teeth formed thereon register with the gashes formed on said blank to form rough gear teeth on said blank while leaving said teeth with a predetermined excess thickness, and finish rolling said rough rolled gear blank with finish dies mounted for rotation about parallel axes spaced from and parallel to axis of said rough rolled blank.

4. The combination as set forth in claim 1 including the steps of end finishing the axial end faces of said gear blank to remove excess metal and finish machining the outside diameter of said blanks.

5. The combination as set forth in claim 2 including the steps of end finishing the axial end faces of said gear blank to remove excess metal and finish machining the outside diameter of said blanks.

6. The combination as set forth in claim 1 including the step of heat treating said blank following the finish rolling operation to provide desired surface hardness and impact strength.

7. The combination as set forth in claim 2 including the step of heat treating said blank following the finish rolling operation to provide desired surface hardness and impact strength.

References Cited
UNITED STATES PATENTS

| | | |
|---|---|---|
| 1,642,179 | 9/1927 | Schurr. |
| 2,720,801 | 10/1955 | Erdelyi et al. _____ 72—103 X |
| 2,883,894 | 4/1959 | Tsuchikawa. |
| 2,886,990 | 5/1959 | Bregi. |
| 2,906,147 | 9/1959 | Pelphrey. |
| 3,368,263 | 2/1968 | Harris _____ 29—159.2 |

JOHN F. CAMPBELL, Primary Examiner

V. A. DI PALMA, Assistant Examiner

U.S. Cl. X.R.

72—104